(12) United States Patent
Joergensen

(10) Patent No.: US 6,529,957 B1
(45) Date of Patent: Mar. 4, 2003

(54) METHOD FOR INCREASING PERFORMANCE ON A DEDICATED MULTI-SPEED ETHERNET LINK SEGMENT

(75) Inventor: Thomas Kirkegaard Joergensen, Hellerup (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/139,439

(22) Filed: Aug. 25, 1998

(51) Int. Cl.⁷ .......................... G06F 15/16; H04L 12/66
(52) U.S. Cl. ...................... 709/233; 709/250; 370/463
(58) Field of Search ............................ 709/224, 232, 709/233, 250, 253; 370/244, 463, 465–468; 710/60; 714/704, 708

(56) References Cited

U.S. PATENT DOCUMENTS

| | | | | |
|---|---|---|---|---|
| 5,307,354 A | * | 4/1994 | Cramer ........................ | 714/4 |
| 5,541,957 A | * | 7/1996 | Lau ............................ | 375/257 |
| 5,596,575 A | * | 1/1997 | Yang et al. .................. | 370/468 |
| 5,598,410 A | * | 1/1997 | Stone ......................... | 370/469 |
| 5,754,522 A | * | 5/1998 | Kobayashi et al. ......... | 369/275.3 |
| 5,838,989 A | * | 11/1998 | Hutchison et al. .......... | 710/11 |
| 5,922,052 A | * | 7/1999 | Heaton ....................... | 709/223 |
| 5,991,303 A | * | 11/1999 | Mills .......................... | 370/402 |
| 5,995,488 A | * | 11/1999 | Kalkunte .................... | 370/232 |
| 6,115,389 A | * | 9/2000 | Mahale et al. .............. | 370/442 |
| 6,151,326 A | * | 11/2000 | McGuire et al. ........... | 370/402 |
| 6,169,729 B1 | * | 1/2001 | Feuerstraeter .............. | 370/296 |
| 6,198,727 B1 | * | 3/2001 | Wakeley et al. ............ | 370/247 |
| 6,222,850 B1 | * | 4/2001 | Johnson ...................... | 370/445 |
| 6,285,659 B1 | | 9/2001 | Feuerstraeter et al. ...... | 370/244 |
| 6,327,264 B1 | * | 12/2001 | Terry et al. ................. | 370/445 |
| 6,359,893 B1 | * | 3/2002 | Mills .......................... | 370/402 |
| 6,363,432 B1 | * | 3/2002 | Laber .......................... | 370/401 |
| 6,400,929 B1 | * | 6/2002 | Ue et al. ..................... | 370/465 |

OTHER PUBLICATIONS

"Physical Layer Link Signaling for 10 Mb/s and 100 MB/s Auto–Negotiation on Twisted Pair," Std. 802.3u–1995, IEEE, pp. 235–280, Oct. 1995.*

"PC/TCP Packet Driver Specification," FTP Software Inc., Wakefield, MA, pp. 1–14, 1989.*

Seiffert, R., "The Effect of Ethernet Behavior on Networks Using High–Performance Workstations and Servers," Tech. Rep., Networks and Communications Consulting, Los Gatos, CA, pp. 1–25, Mar. 1995.*

Stallings, W., "Data and Computer Communications," 5th ed., Prentice Hall, Upper Saddle River, NJ, pp. 55–64, 1997.*

Halsall, F., "Data Communications, Computer Networks and Open Systems," 4th ed., Addison–Wesley Publishing Co., Harlow, England, pp. 352–367, 1996.*

Seifert, R., Issues in LAN Switching and Migration From a Shared LAN Environment, Tech. Report, Networks and Communications Consulting, pp. 1–26, Nov. 1995.*

Derfler, F., et al., How Networks Work, Bestseller Edition, Ziff–Davis Press, pp. 76–89.*

Institute of Electrical and Electronics Engineers, Inc., IEEE Standard 802.3, Clause 28, "Physical Layer link signaling for 10 Mb/s and 100Mb/s Auto–Negotiation on twisted pair," p.p. 689–734, Sep. 28, 1998.

* cited by examiner

Primary Examiner—Andrew Caldwell
(74) Attorney, Agent, or Firm—Kenyon & Kenyon

(57) ABSTRACT

A method for reducing errors on an Ethernet network multi-speed link segment and thereby increasing network stability and performance. An error rate on the link segment is evaluated. When the error rate exceeds a threshold, the link segment is automatically reconfigured to operate at a lower speed Ethernet implementation. According to an embodiment of the present invention, the error rate may be evaluated by one or both of the network entities coupled to the link segment. For example, the network entity could be a switch or a hub. Also, when the network entity is part of a personal computer having an Ethernet interface card, the evaluation of the error rate may be performed by the card of Ethernet driver software.

27 Claims, 2 Drawing Sheets

METHOD FOR INCREASING PERFORMANCE ON A DEDICATED MULTI-SPEED ETHERNET LINK SEGMENT

FIELD OF THE INVENTION

The present invention relates to Ethernet networks, and in particular, to a method for reducing errors on dedicated multi-speed Ethernet link segments.

RELATED TECHNOLOGY

Ethernet local area networks are in wide use today. The term Ethernet is often used to refer to all carrier sense multiple access/collision detection (CSMA/CD) LANs that generally conform to Ethernet specifications, including IEEE (Institute of Electrical and Electronic Engineers) 802.3. IEEE 802.3, for example in the version published on Jul. 29, 1996, sets forth standards for Ethernet-type networks. Ethernet also forms the technological basis for ISO-IEC (International Organization for Standardization-International Engineering Consortium) 8802-3, as published in 1996.

Basic Ethernet, such as 10 Base-T, is capable of a data transmission rate of 10 Mbps (Megabits per second). The need for greater data rates has led to the development of "fast Ethernet", such as 100 Base-TX. 100 Base-TX fast Ethernet runs well, i.e., with acceptable error rates, on EIA-TIA (Electronic Industries Alliance-Telecommunications Industry Association) 568 Category 5 unshielded twisted-pair cable, sometimes called UTP-5, or CAT 5. 100 Base-TX operates with lower signal levels, and therefore requires higher quality cable and is more sensitive to electromagnetic interference than 10 Base-T. While 100 Base-TX is capable of running on Category 3 unshielded twisted-pair cable, or CAT 3, the result is often a poor link segment with many errors.

Autonegotiation is a mechanism specified in IEEE 802.3 whereby the network entities at either end of a link segment automatically determine the data rate at which the link segment will operate. Using autonegotiation, each network entity compares what Ethernet implementation it supports to what implementation network entity at the other end supports. The network entities choose which implementation to use for that network link segment according to a predetermined priority ranking. For example, 100 Base-TX full duplex has a higher priority than 10 Base-T. Most current Ethernet network entities support autonegotiation.

As an Ethernet network is upgraded from 10 Mbps to 100 Mbps equipment, link segment cabling must be upgraded from CAT 3 to CAT 5 to properly support 100 Base-TX. Because such a cabling upgrade is costly, among other reasons, networks are often upgraded in a phased or piecemeal fashion. Thus, some network cable plants may include a mixture of CAT 5 cable and CAT 3 cable. There is a good chance that a 100 Base-TX link may be inadvertently established over a CAT 3 cable. The result of attempting to run 100 Base-TX over CAT 3 cable may be high error rates and an unstable network. An unacceptably high error rate may occur even when running a 100 Base-TX over a CAT 5 cable when the cable is subject to electromagnetic interference. Such electromagnetic interference may be caused by, for example, running the cable in a cable tray alongside power cables. Once a link segment is operating at 100 Base-TX, it may continue to do so even at unacceptably high error rates.

SUMMARY OF THE INVENTION

The present invention provides a method for controlling a data rate on a dedicated multi-speed link segment in an Ethernet network between two network entities, the link segment operating at a first data rate. The method comprises evaluating an error rate on the link segment, and, when the error rate on the link segment exceeds a threshold, automatically reconfiguring the link segment to operate at a second, lower data rate.

BRIEF DESCRIPTION OF THE DRAWINGS

Exemplary embodiments of the method according to the present invention are elucidated in the following description and depicted in the drawings, in which.

DETAILED DESCRIPTION

Figure 1:
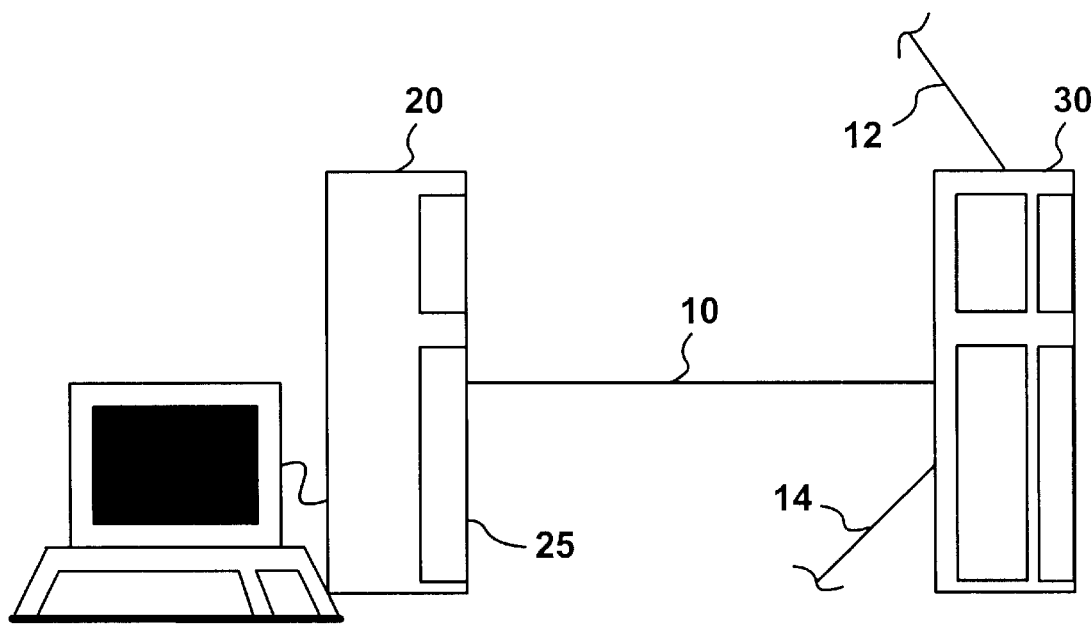
FIG. 1 shows a schematic representation of an Ethernet network in accordance with the present invention.

Referring to FIG. 1, link segment 10 interconnects personal computer (PC) 20 and switch 30. As embodied herein, PC 20 and switch 30 are network entities in an Ethernet local area network. PC 20 and switch 30 are each capable of running multiple Ethernet implementations, such as 10 Base-T or 100 Base-TX, for example, using appropriate software and/or hardware. In other embodiments of the present invention, PC 20 and switch 30 could each be any of a variety of appropriate devices, such as a hub, a router, a printer, etc. PC 20 is preferably configured with an Ethernet interface card 25. As embodied herein, PC 20 and switch 30 each support autonegotiation.

As embodied herein, link segment 10 interconnects PC 20 and network switch 30. Link segment 10 is a Category 3 unshielded twisted-pair (CAT 3) cable. In other embodiments, however, link segment 10 may be a Category 5 unshielded twisted-pair (CAT 5) cable, or other type of cable. As embodied herein, link segment 10 is capable of multiple data rates, such as 10 Mbps and 100 Mbps.

PC 20 and switch 30, along with link segment 10, form part of an Ethernet, e.g., an IEEE 802.3, local area network. The network topology may be Ring, Star, or other configuration in which link segment 10 is a dedicated, multi-speed link between PC 20 and switch 30. As embodied herein, switch 30 is an Ethernet switch forming the center of a Star topology network. Link segments 10, 12 and 14 radiate from switch 30. As embodied herein, link segments 12 and 14 are connected to other network entities (not shown), although link segments 12 and 14 are not required for the present invention.

Figure 2:
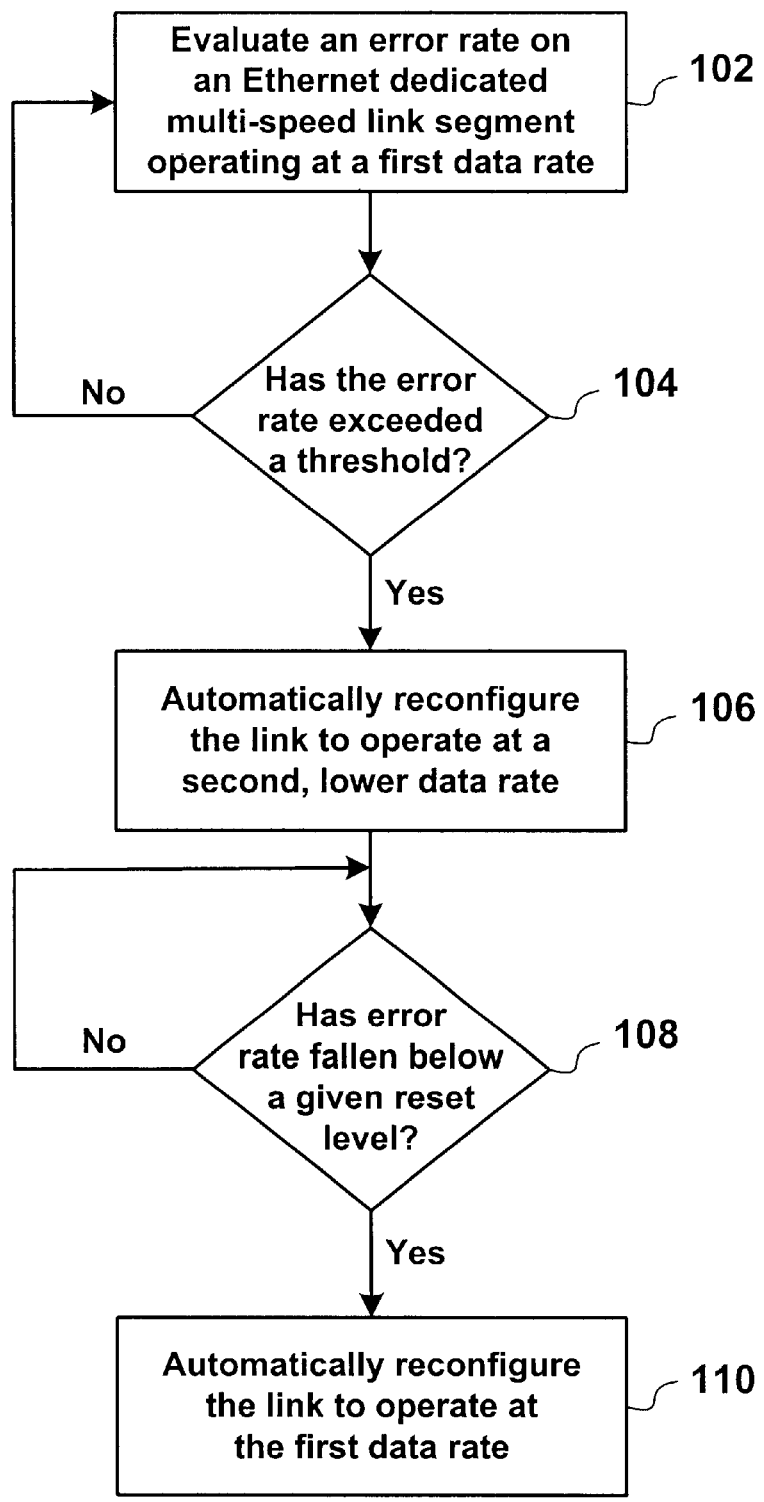
FIG. 2 shows a flowchart of an exemplary embodiment of the method of the present invention.

Referring now to FIG. 2, in an exemplary embodiment of the method of the present invention, an error rate on link segment 10 is evaluated, represented by step 102. As embodied herein, the error rate evaluated is the symbol error rate in transmission between PC 20 and switch 30. In other embodiments of the present invention, the error rate can be a cyclic redundancy check (CRC) error, a sum of both symbol error and CRC, or another suitable error measure.

As embodied herein, the error rate on link segment 10 is measured by an Ethernet controller (not shown) in PC 20 and an Ethernet controller (not shown) in switch 30. An Ethernet controller in PC 20 is preferably part of Ethernet interface card 25. In other embodiments, the error rate on link segment 10 may be determined in only one network entity or by other suitable means. The error rate on link segment 10 may be due to a variety of causes, such as cable errors due to cable type, length, location and quality, electromagnetic interference noise, and physical interface problems.

As shown in block 104, the error rate is compared to a given, or predetermined, threshold. When the error rate on link segment 10 exceeds the threshold, according to the present invention the link is automatically reconfigured to a second, lower speed (data rate) Ethernet implementation, as shown in block 106. For example, a link running at 100 Base-TX would be reconfigured to operate at 10 Base-T. As embodied herein, the reconfiguration of link segment 10 to run at a lower speed is effected using instructions coded in software. The software may reside on any network entity, such as either PC 20 or switch 30, or both. The software may be run by a processor in any network entity, such as either PC 20 or switch 30, or both, or by any external processor. For PC 20, the software is preferably part of the Ethernet driver software. For switch 30, or for a hub or a router, the software of the present invention is preferably part of the loaded software of the device.

Preferably, the software of the present invention is loaded in, and runs on, both PC 20 and switch 30. In this way, errors in both receive and transmit wire pairs of the link segment 10 cable are used in implementing the method of the present invention. In other embodiments, the software of the present invention is loaded only on switch 30 so that no modification to connected network entities, such as PC 20, are required. It is advantageous from a network administration standpoint to modify or load software in a switch at the factory or on an operational network by a network manager. Likewise, the method of the present invention may be overridden or disabled by a network manager. In other embodiments of the present invention, the software of the present invention could reside in/or be run on any suitable device connected to a network entity, for example, the software could be run on a managed hub central processor module connected to a simple hardware hub. Alternatively, in other embodiments, the method of the present invention may be implemented in hardware. Implementing hardware may be built into an ASIC (Application-Specific Integrated Circuit) or other hardware on Ethernet interface card 25, for example. In other embodiments of the present invention, implementing hardware could be located in switch 30, or in any other suitable platform.

The method of the present invention works in conjunction with the autonegotiation feature of a network entity to reconfigure the network entity to a lower speed Ethernet configuration when a predetermined error rate threshold is reached. As long as both PC 20 and switch 30 support autonegotiation, only one of these network entities need perform the method of the present invention. When the network entity is reconfigured to a lower speed Ethernet implementation, a connected network entity will automatically reconfigure to the same speed Ethernet implementation through autonegotiation. As embodied here, the link segment remains at the lower speed Ethernet implementation until the link segment is deactivated or otherwise goes down, such as when the network is powered off, etc. In other embodiments of the present invention, the link segment is returned to the original, higher speed Ethernet implementation once certain conditions, e.g., error thresholds, are met. For example, in decision block 108 it is determined whether the error rate has fallen below a given reset level. If it has then in block 110, the link is automatically reconfigured to operate at the first data rate.

The method of the present invention works in conjunction with the autonegotiation feature of a network entity to reconfigure the network entity to a lower speed Ethernet configuration when a predetermined error rate threshold is reached. As long as both PC 20 and switch 30 support autonegotiation, only one of these network entities need perform the method of the present invention. When the network entity is reconfigured to a lower speed Ethernet implementation, a connected network entity will automatically reconfigure to the same speed Ethernet implementation through autonegotiation. As embodied herein, the link segment remains at the lower speed Ethernet implementation until the link segment is deactivated or otherwise goes down, such as when the network is powered off, etc. In other embodiments of the present invention, the link segment is returned to the original, higher speed Ethernet implementation once certain conditions, e.g., error thresholds, are met.

The predetermined error rate threshold at which the method of the present invention reconfigures a network entity to a lower speed Ethernet implementation may be set in a variety of ways. Preferably, the error rate threshold is set by a network manager at switch 30, as this is administratively convenient and requires no changes to PC 20. In other embodiments of the present invention, the error rate threshold may be preloaded at the given network entity, may be set as a function of network traffic conditions, or set in other suitable ways.

The method of the present invention may be implemented in any suitable software language. In one example embodied herein, the method of the present invention may be implemented in PASCAL code as follows:

```
If PORTTYPE=10/100 Base-TX and AUTO NEG=TRUE
   and
LINKTYPE=100 and LINK=UP and PARTNER=10/100
   Base-TX then
{use this feature if both ends of the link segment support
   10 Base-T,
100 Base-TX and auto negotiation}
Begin
   LINK_ERRORS:=0;
   {start by setting link error to 0}
   While LINK_ERRORS<MAX_ERRORS and
      LINK=UP do
   {Check for too many symbol errors once a minute}
   Begin
   LINK_ERRORS:=0;
   {reset error counter each minute}
   Wait(60 sec);
   End;
   If LINK_ERRORS >MAX_ERRORS and LINK=UP
      then
   {If there are too many symbol errors set mode to 10
      Base-T only and
   restart
   autonegotiation}
   Begin
   AN-ADVERTISMENT:=10 Base-T;
   {advertise only 10 Base-T}
   RESTART-AN:=TRUE;
   {AN (autonegotiation) will give a 10 Base-T link}
   Wait(5 sec);
   {wait for link to come up}
   While LINK=UP do NOP; {wait for the link to go
      down}
   AN-ADVERTISMENT:=10/100 Base-TX;
      {set back to default after link down}
   End;
End;
```

Variations may be made in the method steps and physical implementations that are within the scope of the present invention. For example, the method of the present invention may be applied to reconfigure a multi-speed Ethernet link from 1000 Base-TX, as in a future gigabit Ethernet, to 100 Base-TX, or any other lower speed. The present invention can be used in general to reconfigure a multi-speed Ethernet link segment operating at any given speed to a lower speed Ethernet implementation when the error rate on the link segment reaches a predetermined configurable threshold. The present invention is applicable to Ethernet variations and speed implementations which may be developed in the future. The present invention may be implemented in either software or hardware residing on any of a variety of platforms and being run by any of a variety of platforms. These and other variations within the scope of the claims are contemplated parts of the present invention.

What is claimed is:

1. A method for controlling a data rate on a dedicated multi-speed link segment in an Ethernet network between first and second network entities, the link segment operating at a first data rate, the method comprising:

evaluating an error rate on the link segment; and when the error rate on the link segment exceeds a threshold, automatically reconfiguring the link segment to operate at a second, lower data rate; and automatically reconfiguring the link segment to operate at the first data rate when the error rate on the link segment falls below a given reset level.

2. The method as recited in claim 1 wherein at least one of the first and second network entities supports autonegotiation to reconfigure the link segment to operate at the second data rate.

3. The method recited in claim 1 wherein the Ethernet network conforms to an IEEE 802.3 standard.

4. The method recited in claim 1 wherein the threshold is configurable by a network user.

5. The method as recited in claim 1 wherein the evaluating is effected at both of the first and second network entities.

6. The method as recited in claim 1 wherein the evaluating is effected at only one of the first and second network entities.

7. The method as recited in claim 1 wherein the first network entity is a switch.

8. The method as recited in claim 1 wherein the second network entity is a personal computer.

9. The method as recited in claim 8 wherein the personal computer includes an Ethernet interface card, the Ethernet interface card performing the evaluating.

10. The method as recited in claim 8 wherein the personal computer includes Ethernet driver software, the Ethernet driver software performing the evaluating.

11. A method for reducing errors due to cable problems on a dedicated multi speed Ethernet link segment between a switch and a personal computer, the link segment running a 100 BASE-TX configuration on twisted pair wires, the method comprising:

evaluating an error rate on the link segment;

when the error rate on the link segment exceeds a threshold, automatically reconfiguring the switch to a 10 BASE-T configuration; and when the error rate on the link segment falls below a given reset level, automatically reconfiguring the link segment to operate at the first data rate.

12. The method as recited in claim 11 further comprising automatically reconfiguring the personal computer to 10 BASE-T using autonegotiation.

13. An Ethernet network comprising:

a first network entity;

a second network entity;

a multi-speed Ethernet link segment connecting the first and second network entities, the Ethernet link segment operating at a first data rate; and at least one processor to automatically reconfigure the link segment to operate at a second, lower data rate when an error rate on the link segment exceeds a threshold and to automatically reconfigure the link segment to operate at the first data rate when the error rate on the link segment falls below a given reset level.

14. The Ethernet network as recited in claim 13 wherein the at least one processor uses autonegotiation to automatically reconfigure the link segment to the second data rate.

15. An Ethernet network comprising:

a first network entity which supports multiple data rates;

a second network entity which supports multiple data rates; and a multi-speed Ethernet link segment connecting the first and second network entities, the Ethernet link segment running at a first data rate;

wherein the first network entity has the capability to automatically reconfigure itself to a second, lower data rate when an error rate on the link segment exceeds a threshold and to automatically reconfigure itself to the first data rate when an error rate on the link segment falls below a given reset level.

16. The Ethernet network recited in claim 15 wherein the second network entity has the capability to automatically reconfigure itself to the second data rate in response to the first network entity reconfiguring itself to the second data rate.

17. The Ethernet network recited in claim 16 wherein the second network entity uses autonegotiation to reconfigure itself to the second data rate.

18. The Ethernet network recited in claim 15 wherein the Ethernet network conforms to an IEEE 802.3 standard.

19. The Ethernet network recited in claim 15 wherein at least one of the first and second network entities is a switch.

20. The Ethernet network recited in claim 15 wherein at least one of the first and second network entities includes an Ethernet interface card.

21. An Ethernet network comprising:

a switch;

a personal computer; and a dedicated multi-speed Ethernet link segment connecting the switch and the personal computer, the link segment running a first Ethernet implementation;

wherein the switch and the personal computer support autonegotiation, and wherein at least one of the switch and personal computer has the capability to evaluate an error rate on the link segment and automatically reconfigure itself to a lower speed Ethernet implementation when the error rate on the link segment per unit time exceeds a threshold and to automatically reconfigure itself to the first Ethernet implementation when the error rate on the network link per unit time falls below a given reset level.

22. An article comprising a storage medium, the storage medium having a set of instructions, the set of instructions being capable of being executed by at least one processor to implement a method for increasing performance on a dedicated multi-speed link segment in an Ethernet network between first and second network entities, the link segment operating at a first data rate, the set of instructions when executed comprising:

evaluating an error rate on the link segment;

when the error rate on the link segment exceeds a threshold, automatically reconfiguring the link segment to operate at a second, lower data rate; and when the error rate on the link segment falls below a given reset value, automatically reconfiguring the link segment to operate at the first data rate.

23. The article recited in claim 22 wherein the at least one processor resides in at least one of the first and second network entities.

24. The article recited in claim 23 wherein the first network entity is a switch, the at least one processor residing in the switch.

25. The article recited in claim 23 wherein the second network entity is a personal computer, the at least one processor residing in the personal computer.

26. The article recited in claim 23 wherein the at least one processor is included in a network peripheral.

27. The article recited in claim 22 wherein autonegotiation is used in reconfiguring the link segment to the second data rate.

* * * * *